United States Patent
Wason

(10) Patent No.: US 7,086,067 B1
(45) Date of Patent: Aug. 1, 2006

(54) DYNAMIC JAVA BEAN FOR VISUALAGE FOR JAVA

(75) Inventor: James Richard Wason, Tuxedo, NY (US)

(73) Assignee: International Business Machines Corporation, Armonk, NY (US)

( * ) Notice: Subject to any disclaimer, the term of this patent is extended or adjusted under 35 U.S.C. 154(b) by 836 days.

(21) Appl. No.: 09/615,973

(22) Filed: Jul. 14, 2000

(51) Int. Cl.
*G06F 9/00* (2006.01)

(52) U.S. Cl. ............... 719/329; 707/100; 715/762; 715/765

(58) Field of Classification Search .......... 707/1–10, 707/100–104.1, 200–204; 717/100–167; 719/331–332, 328; 715/700–866
See application file for complete search history.

(56) References Cited

U.S. PATENT DOCUMENTS

| | | | | |
|---|---|---|---|---|
| 5,418,941 A | * | 5/1995 | Peters | 714/38 |
| 5,832,268 A | | 11/1998 | Anderson et al. | |
| 5,920,725 A | * | 7/1999 | Ma et al. | 717/171 |
| 6,121,964 A | * | 9/2000 | Andrew | 715/866 |
| 6,237,135 B1 | * | 5/2001 | Timbol | 717/107 |
| RE37,722 E | * | 5/2002 | Burnard et al. | 713/1 |
| 6,429,882 B1 | * | 8/2002 | Abdelnur et al. | 715/763 |
| 6,553,563 B1 | * | 4/2003 | Ambrose et al. | 717/116 |
| 6,591,272 B1 | * | 7/2003 | Williams | 707/102 |
| 6,684,438 B1 | * | 2/2004 | Brodersen et al. | 707/10 |
| 6,721,740 B1 | * | 4/2004 | Skinner et al. | 707/10 |

* cited by examiner

*Primary Examiner*—Meng-Al T. An
*Assistant Examiner*—Charles Anya
(74) *Attorney, Agent, or Firm*—Scully, Scott, Murphy & Presser; William E. Schiesser

(57) ABSTRACT

A uniform strategy for the general problem of providing custom editors and initialization strings for beans (all "dynabeans" inherit from a common bean class that incorporates this strategy. This is then extended to allow the initialization strings to be stored in a relational database. The database function is a extension of the function provided by VisualAge Persistence Builder (using some of the EADP extensions). An important advantage of this approach is that many changes to the application can now be handled by adjusting the database version of the bean definition, without a need to touch the underlying code. This will reduce down time for the application, and also improve application stability.

2 Claims, 2 Drawing Sheets

1. A mechanism to store bean initialization strings on a relational database;

2. A mechanism to initialize the bean value using the database version of the initialization string;

3. Runtime edit support;

4. A mechanism to provide linkage of the encloser, value, editor, and custom edit panel; and 5. Support to make it easy to create dynamic beans and custom editors.

Figure 2

DYNAMIC JAVA BEAN FOR VISUALAGE FOR JAVA

CROSS REFERENCE TO COPENDING APPLICATIONS

The disclosure of this application is related to the disclosures of the following copending applications:

"Business Logic Support," Ser. No. 09/616,800 filed Jul. 14, 2000;

"Text File Interface Support In An Object Oriented Application," Ser. No. 09/616,809, filed Jul. 14, 2000;

"Flexible Help Support In An Object Oriented Application," Ser. No. 09/616,808, filed Jul. 14, 2000; and "Complex Data Navigation, Manipulation And Presentation Support," Ser. No. 09/615,976, filed Jul. 14, 2000;

the disclosures of the four above-identified copending applications are hereby incorporated herein by reference in their entireties.

BACKGROUND OF THE INVENTION

This invention generally relates to computer applications of the type referred to as Java beans. More specifically, the invention relates to managing application definitions, made from Java bean initialization strings, used in such computer applications.

A Java bean consists of properties, each of which has an associated property editor. During bean customization (during build time) the property editor is assigned the value of the property, which it can display to the user (more advanced property editors use a custom editor for this purpose). The property editor then returns a "Java initialization string" which is used to customize the value of the property based on what happened during the edit session.

There are usually three classes involved during bean customization:

The Encloser

This is the class that contains the bean as an attribute. The customization of the bean is in relation to its encloser.

The Bean

This is the class that owns the property. In VisualAge, the bean's property sheet is opened to begin customization of the properties.

The Value

This is the property being changed.

Java bean support provides a way of externalizing many application features and presenting them in a simple form using customized bean editors. However, changes to the bean properties require that the enclosing class be recompiled (and reloaded into the runtime environment). For many applications, this is inconvenient. There are some factors affecting the application which need to be changed on a regular basis (examples might be interest rates, valid values for data elements with discrete values, or workflow patterns). A common strategy for factors of this type has been to store them on a database, and write code to retrieve them.

In the VisualAge implementation of bean support, persistence for the bean customization is achieved by modifying the method that initializes the bean. Code is added to this method to initialize the value that was customized (the property) using the contents of the Java initialization string.

Many properties use custom editors; some base support for this is provided by java.beans.PropertyEditorSupport.

SUMMARY OF THE INVENTION

An object of this invention is to allow Java bean initialization strings to be stored and manipulated on a relational database.

Another object of the present invention is to allow Java bean values to be changed dynamically after the Java code has been compiled.

A further object of this invention is to allow the Java bean definition to be registered on a database, as well as compiled into the code, and thereby allow the definition to be changed without a need to recompile the enclosing class.

This invention provides a uniform strategy for the general problem of providing custom editors and initialization strings for beans (all "dynabeans" inherit from a common bean class that incorporates this strategy. This is then extended to allow the initialization strings to be stored in a relational database. The database function is a extension of the function provided by VisualAge Persistence Builder (using some of the EADP extensions).

An important advantage of this approach is that many changes to the application can now be handled by adjusting the database version of the bean definition, without a need to touch the underlying code. This will reduce down time for the application, and also improve application stability. Since dynabean manipulation is totally external to the Java build-time environment, it is also possible to train an administrator to adjust the bean values (using sophisticated custom editors). There is no need to understand Java coding to be able to make these adjustments to the bean properties.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 2 illustrates the major features of a preferred embodiment of the invention.

DETAILED DESCRIPTION OF THE PREFERRED EMBODIMENTS

Figure 1:
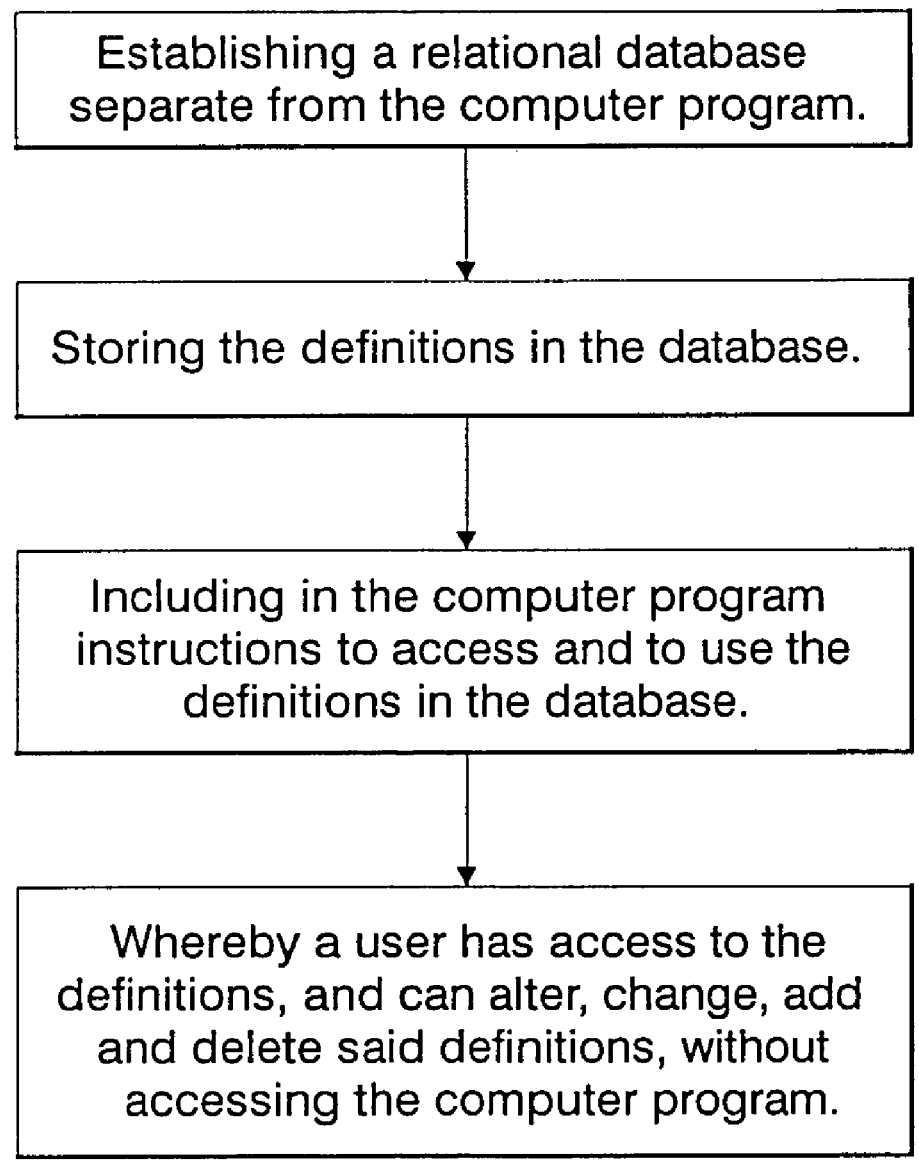
FIG. 1 is a flow chart outlining a method embodying this invention.

With reference to FIG. 1, the present invention, generally, relates to a method and system for managing application definitions used in a computer program. The method comprises the steps of establishing a relational database separate from the computer program, storing the definitions in the database, and including in the computer program instructions to access and to use the definitions in the database. In accordance with this invention, and as described in detail below, a user has access to these definitions, and can alter, change, add and delete those definitions without accessing the computer program.

With reference to FIG. 2, the preferred embodiment of the invention includes the following major features:

1. A mechanism to store bean initialization strings on a relational database;

2. A mechanism to initialize the bean value using the database version of the initialization string;

3. Runtime edit support;

4. A mechanism to provide linkage of the encloser, value, editor, and custom edit panel; and 5. Support to make it easy to create dynamic beans and custom editors.

Each of these features is discussed below.

1. A mechanism to store bean initialization strings on a relational database.

These are keyed by the class names of the encloser and the value (note the restriction that all occurrences of the value class within the encloser will pick up the same initialization string. Usually this will be used for structures where the value class has a unique occurrence as subattribute of the encloser). This includes the ability to create the registry database, and additional methods for the custom editors to allow updates to the registry at build time and at runtime. The runtime implementation includes an Applet that lists all registered dynamic bean values and brings up the custom editor for a selected bean value.

The database implementation will work on any relational database.

2. A mechanism to initialize the bean value using the database version of the initialization string.

This is accomplished by adding an extra fragment of code within the Java initialization string for the dynamic bean. The extra fragment adds a call to a method which checks for the database value. The method is passed the encloser (which is "this") and the class name of the value, along with the initialization string derived from the state of the value at build time. The encloser class name and the class name of the value are used as keys to find the initialization string (the results are cached for improved performance). If no database entry is found, the passed string (the buildtime definition) is returned.

3. Runtime edit support.

An Applet is provided that displays all entries available in the database registry (the class names of pairs of enclosers and values). When a pair is selected, the custom edit panel can be opened—this displays the same custom edit panel used at build time. The database version of the bean can be updated from here.

4. A mechanism to provide linkage of the encloser, value, editor, and custom edit panel.

This linkage allows the custom editor to look at other attributes of the encloser. The technique is to add a class attribute to the editor which holds the class type of the encloser. The method in the encloser that initializes the bean needs to be modified to set this class attribute. When the custom edit panel is initialized, it is assigned a new instance of the encloser (created using the class attribute).

5. Support to make it easy to create dynamic beans and custom editors.

Java interfaces are defined for the encloser and value. This allows concrete implementation of classed to do all the database manipulation. In addition, a base class is provided that extends PropertyEditorSupport and implements the deferred methods to provide a custom edit panel and a Java initialization string (the string generated includes the extra hook to pick up the database value). A base class for the custom edit panel is provided, along with methods that implement the linkage described above (except for the assignment of the class type of the encloser, which must be manually added).

Additional technical details about the preferred embodiments of the invention are given below.

EADPDynaBeanController provides database support. It extends EADPAppicationClass (This is described in the above-identified copending application "Complex Object Navigation, Manipulation and Presentation"). This uses VisualAge Persistence Builder; the services class to access the dynabean registry can be adapted to connect to the correct application database at runtime (the datastore for the encloser is used to connect the dynabean datastore to the correct database). The data manager (an instance of EADPDAManager) is customized to set up its query string to use "encloser" and "valname" (these hold the class names of the encloser class and the value class).

Because some database systems do not handle large strings, the initialization string is broken into 80 byte segments when it is stored. An additional key, "sequence" is defined to handle this (so that "sequence" is used to order the results of the query). The sequence number is defined as character instead of number (so that the database definition can be uniform on all database managers). It is a three byte field which is stored as "001", "002", etc.

2. Retrieval

The javastring method is used to retrieve a stored initialization string (this is method call that is added as a hook when the Java initialization string is generated). It is passed the encloser, the class name of the value and the default initialization string. An internal registry is maintained (this is a Hashtable where the key is the class name of the encloser plus the class name of the value). A check is made to see if there is already an entry; if there is and it is not a null string, it is returned. If a null string (as opposed to null) is found, this means that a database search was done and no entry was found. In this case the passed initialization string is returned.

If there was no entry found, a database lookup is needed. Before this is done, the connection is set up using the datastore associated to the encloser. The method setEncloserKey is used to set up the keys for the data manager. This sets up a query string with the key values (the class name of the encloser and value); once this is done, the data manager is ready to find all the rows matching those keys. Next the dbString method is called. This calls the open method on the dataManager, then fill. It then iterates over the results, and concatenates the string values (stored in the beanval" column) to create the database version of the initialization string. If no entries are found, a null string is returned.

3. Storage

The registerValue method is used to store an initialization string on the database. It is passed the encloser, the value, and the new value for the initialization string. It uses techniques similar to those used for retrieval to find all matching rows and delete them. It then breaks the passed initialization string into 80 byte segments and adds a new row for each one (incrementing the sequence). The cached registry is also updated with the new value so that it is picked up immediately if the custom editor is opened again during a runtime edit session.

4. Database Creation

The createRegistryTable has an SQL statement to create the registry table (which is executed using the current connection, so it adds the registry table to the database for that connection). A button to invoke this is added to the complex object custom editor described in the above-identified application "Complex Data Navigation, Manipulation and Presentation. The button is disabled if the table already exists. The table name is EADPBEAN.EADPBEAN.

5. Linkage

The class is added as a property of EADPDatabaseDefinition (which is described in the above-identified copending application "Complex Data Navigation, Manipulation and Presentation"). It picks up its default connection definition from the datastore bean associated to its enclosing database definition.

6. Encloser Definition

An interface EADPDynaBeanEncloser is defined. This has three methods, currentDynaBeanController (which returns an instance of EADPDynaBeanController), getDynaBeanDataDefinition (which returns an instance of EADPDatabaseDefinition) and setDynaBeanDataDefinition (which is passed an instance of EADPDatabaseDefinition). The encloser is used for the callback to javastring. The definition class related methods are used to pass a connection through to the controller.

7. Value Definition

An interface EADPDynaBeanVAlue is defined. This has four methods, getJavaString, getDynaString, setFromString, and setEncloser. getJavaString and getDynaString both return the initialization string; however, the getJavaString would include line breaks and literal quote and plus signs so that it is suitable to be included in source code. The getDynaString just returns the string. The setFromString method initializes the value from the initialization string. Any implementation of EADPDynaBeanValue is expected to have a constructor that takes the encloser and value as parameters, and then calls the equivalent of setEncloser and setFromString. These methods also need to be available so that the value can be initialized after a Class.forName is used to set up the class (this is done by the runtime editor).

8. Custom editor support.

The EADPDynaBeanDisplay class is defined as a base class for dynamic bean custom editors. It has two properties, the current editor (of type EADPDynaBeanEditor) and the current encloser (of type EADPDynaBeanEditor). It also provides a registervalue method which calls the registervalue method on EADPDynaBeanController, and a button to invoke that method. The linkage to set up currentValue and currentEditor is described next.

9. Property Editor Support

The EADPDynaBeanEditor class extends PropertyEditorSupport and makes most of its methods effective. A child class basically needs to inherit this class without changes; however, naming conventions are important. If the value class is Foo, the child class for the property editor should be named FooEditor, and the custom edit panel should be name FooDisplay. If these default naming conventions are kept, no other coding needs to be done to implement a child of this class.

The getJavaInitializationString method is implemented to include the callback to the javastring method. The returned string is new [value class name] (this, this.currentDynaBeanController( ).javaString(this, "[value class name]", [value javastring])

This code fragment is included in an initialization method of the class being customized (so that "this" is the encloser class). The abstract methods defined for the value and encloser classes allow this method to be effective.

A class attribute encloserClass (of type Class) and get and set methods (also class methods) are provided. It is the responsibility of the encloser to set its class type into this attribute as the bean that holds the value is initialized.

An edit panel property of type EADPDynaBeanDisplay is included. The getEditPanel method is modified to set the currentEncloser and currentEditor properties on the edit panel as it is initialized. The currentEncloser is set by creating a new instance of the encloser using the class type stored in the encloserClass class attribute. Also, the type of the edit panel is determined from the class type for the value (adding "Display" to the class name for the value and using Class.forName).

The getCustomEditor property is implemented to return the editPanel.

The supportsCustomEditor property is redefined to return true.

10. A mechanism to initialize the bean value using the database.

This is provided by the implementation of getJavaInitializationString described above.

11. A mechanism to provide runtime bean editor support

The EADPDynaaBeanDatabaseDisplay class is an Applet that allows runtime invocation of the custom editors. It provides a connect button, and text fields to enter the userid and password. The URL and driver can be passed as parameters in the Applet tag so that they can be adjusted. As an alternative, the class has databaseDefinition property of type EADPDatabaseDefinition. If the class is extended, this can be customized to point to the database definition class for a particular database, which has been set up with the URL and driver information.

This class presents two drop down lists, one of encloser names and one of value names (the second list is refreshed when an entry in the first one is selected). To populate these lists, all rows are retrieved from the eADPBEAN table using the open-method of the EADPDynaBeanController. These are sorted by encloser and bean to build up lists of enclosers and beans that are presented to choose which dynabean to customize.

Once an encloser and value have been selected from the lists, the Show button is enabled. This is connected to the showEditor method (which takes the selected encloser name and value name as parameters). This method uses the passed class names to create new instances of the class type. The value name is also used to create instances of the edit panel and the display panel. The database definition property of this class (which is connected) is assigned to the encloser (this also ensures that the same registry cache is updated when the register function is applied from the custom edit panel for the value). The value is initialized from the database value of the initialization string using setFromString. It is then assigned as the value to the editor, and the editor and the value are assigned to the display panel. Finally, a new instance of EADPDynaBeanDBBeanFrame is created, passing the display panel. This class is a frame that includes EADPDynaBeanDisplay, the constructor substitutes the real display panel. The show method on the new instance of the frame is called to show the custom editor.

The preferred embodiment of the invention, as described above, has a number of important advantages.

1. The same custom editor can be used for both build time and run time customizations.

Typically the custom editor will make use of complex attributes of the value and possibly also use other attributes of the encloser. When the editor is invoked at runtime (using the database definitions) both the value and the encloser are instantiated and passed to the editor, so that it has full access to the information it needs.

2. The same database structure can be used for all customizations.

Since the database is just holding initialization strings, the same structure can be used for all types of classes. The ability to parse the string for initialization is already provided by the value classes as a part of their participation in the Java bean customization.

3. The application can be easily customized and modified.

This is particularly important for applications that have to adapt to changing external conditions. Key aspects of the application logic can be captured in dynamic beans. This means many application changes can now be made by an administrator rather than a programmer. Since this invention supports the creation of sophisticated custom editors, this should make it easy to provide an administrative layer implemented using dynamic beans.

The present invention has been implemented in the Enterprise Application Development Platform (EADP). The user manual for this facility is included herein a Appendix A.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

The invention claimed is:

1. A computer implemented method of managing application definitions used in a computer program, comprising the steps:

establishing a relational database separate from the computer program and for serving runtime data to the computer program;

storing the application definitions in the relational database, each of said application definitions comprising a set of rules for processing or storing data used in the computer program, the storing step including the steps of:

i) storing in the relational database initialization strings for the application definitions, and ii) customizing the initialization strings to form the application definitions;

initializing values used in the computer program, using the initialization strings in the relational database during runtime execution of the computer program, wherein the initializing step includes the steps of:

i) invoking a given procedure to check the relational database for a value associated with one of the application definitions;

ii) passing to the given procedure an encloser and a class name for said value; and iii) said given procedure using said encloser and said class name as keys to look for one of the initialization strings in the relational database;

including in the computer program instructions to access and use the application definitions in relational database;

providing a user of the computer program with access, independent of the computer program, to the application definitions in the relational database, whereby the user can, while running the computer program, alter, change, add and delete said application definitions in the relational database, without accessing the computer program;

providing an applet for displaying to the user all of the application definitions in the relational database, each of the application definitions associated with a respective one pair comprised of one encloser and one value;

the user selecting on the said pairs;

in reponse to said selecting, displaying to the user a custom edit panel; and said user using said custom edit panel to change the application definition associated with the selected one of said pairs.

2. A computer implemented method of managing application definitions used in a computer program, comprising the steps:

establishing a relational database separate from the computer program and for serving runtime data to the computer program;

storing the application definitions in the relational database, each of said application definitions comprising a set of rules for processing or storing data used in the computer program, the storing step including the steps of:

i) storing in the relational database initialization strings for the application definitions, and ii) customizing the initialization strings to form the application definitions;

initializing values used in the computer program, using the initialization strings in the relational database during runtime execution of the computer program, wherein the initializing step includes the steps of:

i) adding an extra fragment of code within one of the initialization strings for one of the values used in the computer program, wherein said extra fragment of code adds a call to a given method that checks for said one of the values in the relational database;

ii) passing to the given method an encloser and a class name of said one of the values, along with a derived initialization string derived from a state of said one of the values at build time;

iii) using the encloser and the class name as keys to look for one of the initialization strings in the relational database; and iv) if said one of the initialization string is not found in the relational database, then returning said derived initialization string to the computer program;

including in the computer program instructions to access and use the application definitions in relational database;

providing a user of the computer program with access, independent of the computer program, to the application definitions in the relational database, whereby the user can, while running the computer program, alter, change, add and delete said application definitions in the relational database, without accessing the computer program.

* * * * *

UNITED STATES PATENT AND TRADEMARK OFFICE
CERTIFICATE OF CORRECTION

PATENT NO. : 7,086,067 B1 Page 1 of 1
APPLICATION NO. : 09/615973
DATED : August 1, 2006
INVENTOR(S) : James R. Wason It is certified that error appears in the above-identified patent and that said Letters Patent is hereby corrected as shown below:

On Title page item 54 and col. 1, line 1
In the Title:
   Change "DYNAMIC JAVA BEAN FOR VISUALAGE FOR JAVA" to
   --METHOD OF MANAGING APPLICATION DEFINITIONS USED IN A
   COMPUTER PROGRAM--.

Signed and Sealed this

Twenty-ninth Day of May, 2007

JON W. DUDAS
*Director of the United States Patent and Trademark Office*